US007073947B2

(12) United States Patent  
Kobayashi

(10) Patent No.: US 7,073,947 B2  
(45) Date of Patent: Jul. 11, 2006

(54) BEARING STRUCTURE OF A MOTOR

(75) Inventor: Koichi Kobayashi, Kawasaki (JP)

(73) Assignee: Igarashi Electric Works Inc. (JP)

( * ) Notice: Subject to any disclaimer, the term of this patent is extended or adjusted under 35 U.S.C. 154(b) by 106 days.

(21) Appl. No.: 10/823,882

(22) Filed: Apr. 14, 2004

(65) Prior Publication Data

US 2005/0069236 A1    Mar. 31, 2005

(30) Foreign Application Priority Data

Sep. 29, 2003    (JP)   ............................. 2003-271465  
Dec. 11, 2003    (JP)   ............................. 2003-412896

(51) Int. Cl.  
     *F16C 17/10*      (2006.01)

(52) U.S. Cl. ....................................... 384/279

(58) Field of Classification Search ................ 384/279, 384/902, 294, 295, 204  
See application file for complete search history.

(56) References Cited

U.S. PATENT DOCUMENTS 5,455,471 A * 10/1995 Dowell ....................... 384/495  
5,899,572 A      5/1999 Strobl

FOREIGN PATENT DOCUMENTS

| JP | 56-67994 | 11/1982 |
| JP | 59-69660 | 5/1984 |
| JP | 59-159159 | 9/1984 |

* cited by examiner

*Primary Examiner*—Lenard A. Footland

(57) ABSTRACT

An oil retaining bearing that supports a shaft of a motor is engaged in a pocket of a casing for the motor. A bearing holder comprises a boss and an outer brim welded on the casing which surrounds the pocket, thereby preventing the oil retaining bearing from coming out of the pocket.

5 Claims, 3 Drawing Sheets

BEARING STRUCTURE OF A MOTOR

BACKGROUND OF THE INVENTION

The present invention relates to the bearing structure of a motor in which a shaft is supported by an oil retaining bearing.

A motor that has an oil retaining bearing is widely used as a small motor in audio-visual equipment. In place of a ball bearing, an oil retaining bearing is used to support a shaft of such a small motor promoting greater cost-effectiveness. The oil retaining bearing is disposed around a shaft in a pocket of a casing of a motor as disclosed in U.S. Pat. No. 5,899,572.

However, in the known bearing structure of a motor as above, it is disadvantageous for the oil retaining bearing in the pocket of the casing to loosen owing to vibration caused by rotation of the motor and external force on the shaft. The oil retaining bearing as loosened is likely to come out of the pocket or to rotate together with the shaft in the pocket.

The oil retaining bearing is strongly engaged in the pocket. If they are caulked together, the oil retaining bearing is deformed thereby making insertion of the shaft more difficult and hindering the maintenance of a predetermined clearance to affect its rotation.

When external force is applied to the shaft of the motor in a thrust direction, the shaft is moved in the same direction by the external force. Thus, a commutator or a gear engaged in the shaft of the motor is moved together in the thrust direction. Owing to such motion in the thrust direction, the commutator and gear are deviated from a normal position to affect operation of the gear thereby causing noise. It is difficult to obtain the same play in the thrust direction in a known ball bearing of a motor.

If the commutator is deviated from a normal position, relative position to a magnet in the casing will lead abnormal rotation. Furthermore, if the gear and commutator are deviated widely in the thrust direction, they are engaged with the oil retaining bearing causing mechanical abnormality at the engagement position resulting in abnormal rotation.

Therefore, in the known bearing structure having an oil retaining bearing, it is difficult to restrain the motion of a shaft of a motor in the thrust direction.

SUMMARY OF THE INVENTION

In view of the foregoing disadvantages in the known art, it is an object of the present invention to provide the bearing structure of a motor to prevent an oil retaining bearing from loosening and coming out of a pocket or to prevent it from rotating together with a shaft, limiting play in a thrust direction of the shaft under a certain value.

BRIEF DESCRIPTION OF THE DRAWINGS

The above and other features and advantages of the invention will become more apparent from the following description with respect to embodiments as shown in accompanying drawings wherein.

DETAILED DESCRIPTION OF PREFERRED EMBODIMENTS

The first embodiment of a motor according to the present invention will be described with respect to FIGS. 1 to 3.

Figure 1:
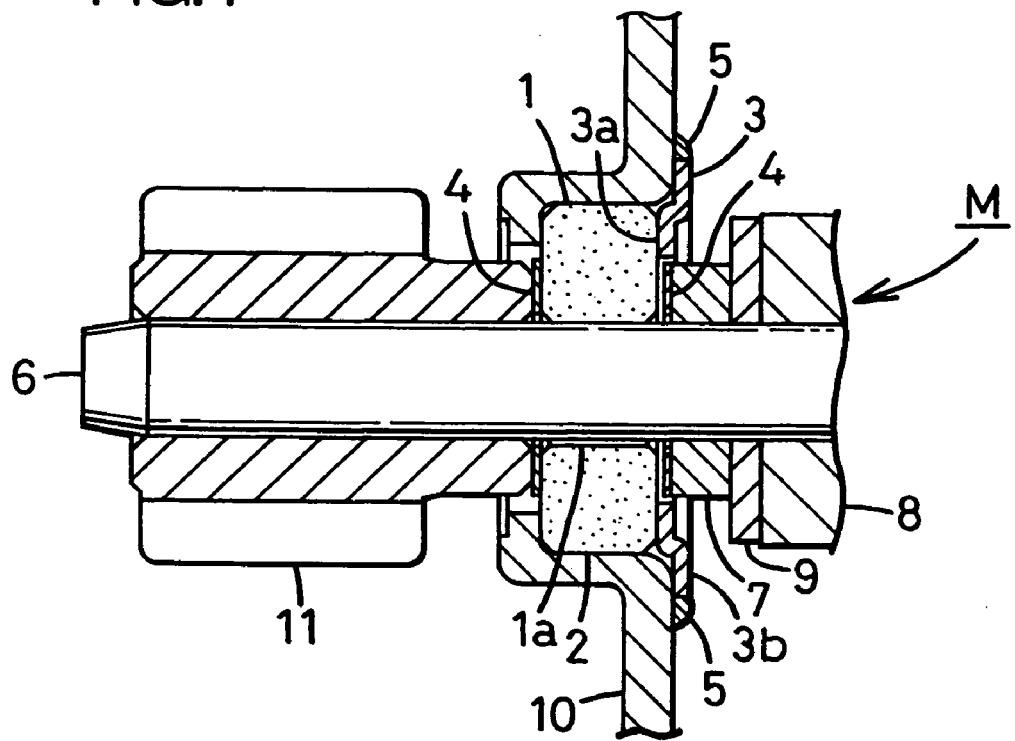
FIG. 1 is a vertical sectional front view of the first embodiment of the bearing structure of a motor according to the present invention.

FIG. 1 is a vertical sectional front view of a bearing portion of the motor "M" and illustrates an oil retaining bearing 1; a casing 10 for the motor or a shield cap in this embodiment; a pocket 2 of the casing 10; a shaft 6 for the motor "M"; and a thrust washer 4,4 which is put on the shaft 6.

The shaft 6 is surrounded by a commutator 8 for rotating the motor "M"; an oil slinger 9 for preventing adhering of oil oozing from the oil retaining bearing 1 onto the commutator 8; and a collar 7 for spacing the commutator 8 and oil slinger 8 from the oil retaining bearing 1 at a certain distance.

The shaft 6 is rotatably engaged in an axial bore 1a of the oil retaining circular bearing 1 and has a suitable clearance for enabling the shaft 6 to slide therein owing to a combination of the internal diameter of the axial bore 1a and the external size of the shaft 6.

Lubricating oil is retained in the porous bearing 1, and frictional heat generated from a sliding interface between the outer surface of the shaft 6 and the inner surface of the axial bore 1a allows the oil to ooze onto the surface of the axial bore 1a thereby achieving lubrication. The oil retaining bearing 1 may be preferably a sintered bronze oil retaining bearing made of 9.5% of Sn; 0.5% of impurities; and a balance of Cu. The lubricating oil may be fluorine oil.

The oil retaining bearing 1 is placed in a circular pocket 2 formed in a casing of the motor "M" by pressing or cutting. The oil retaining bearing 1 is made of a porous metal and is relatively weak to mechanical stress. Thus, to place the oil retaining bearing 1 in the pocket 2, fit tolerance of them is set so as not to induce deformation in the oil retaining bearing 1.

Figure 2:
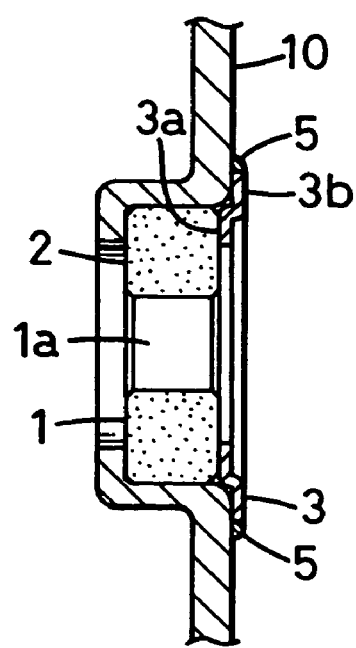
FIG. 2 is a vertical sectional view of an oil retaining bearing thereof.
Figure 3:
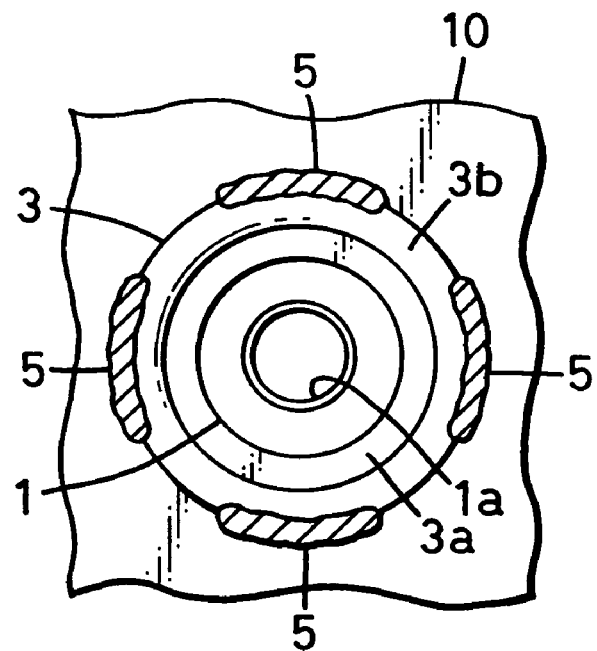
FIG. 3 is a front view of the oil retaining bearing in FIG. 2.

The oil retaining bearing 1 in the pocket 2 is fitted not to go out of the pocket 2 with a bearing holder 3 as shown in FIGS. 2 and 3. The bearing holder 3 comprises a disk such as a cold-rolled steel disk having thickness of 0.5 mm.

The bearing holder 3 comprises a boss 3a and an outer brim 3b. The outer brim 3b is engaged and welded on the inner surface of the casing 10 such that the oil retaining bearing 1 is engaged on the end face of the boss 3a and the boss 3a is put in the pocket 2. The welding may be made over the whole circumference of the outer brim 3b or at four welded portions 5 equally spaced in a circumferential direction. Laser beam welding may be preferably employed to assure speed, low cost and a high degree of accuracy.

A gear 11 for transmitting power to the outside of the motor "M" is engaged on the outer surface of the shaft 6 inserted in the axial bore 1a of the oil retaining bearing 1. Between the gear 11 and the oil retaining bearing, a thrust washer 4 is provided.

Meanwhile, inside the oil retaining bearing 1, the commutator 8 is engaged on the shaft 6. Between the commutator 8 and the oil retaining bearing 1, the oil slinger 9, collar 7 and thrust washer 4 are provided on the shaft 6 in order. The thrust washer 4 is made of stainless steel approximately 0.2 mm thick.

The oil slinger 9 that prevents intrusion of oil oozing from the oil retaining bearing 1 may be made of fiber-containing phenol resin in view of oscillation/high temperature resistance.

The collar 7 plays the role of keeping the commutator 8 at a predetermined position in the casing 10 and keeping distance between the oil retaining bearing 1 and the commutator 8. The collar 7 is press-fit over the shaft 6 and made of stainless steel Play in a thrust direction of the shaft 6 is determined by a clearance between the surface of the washer 4 to the collar 7 and the end face of the collar 7, the washer 7 being positioned between the collar 7 and the oil retaining bearing 1. For example, the play is determined to be 0.1 mm. The play is in a thrust direction of the shaft 6, and the clearance between the end face of the collar 4 and the washer 4 may be preferably controlled by size tolerance. The predetermined value of the play provides exact rotation of the motor "M" thereby restraining oscillation and noise. Correct play causes neither abnormal wear nor contact.

Figure 4:
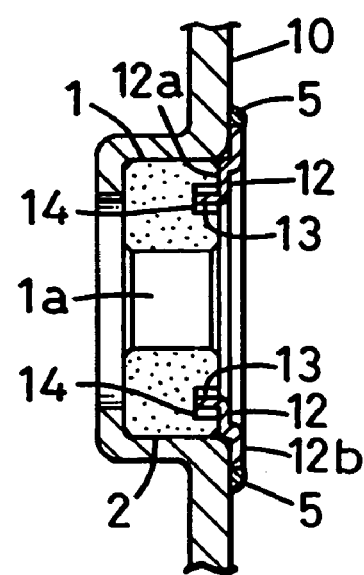
FIG. 4 is a vertical sectional view of an oil retaining bearing in the second embodiment of the invention.
Figure 5:
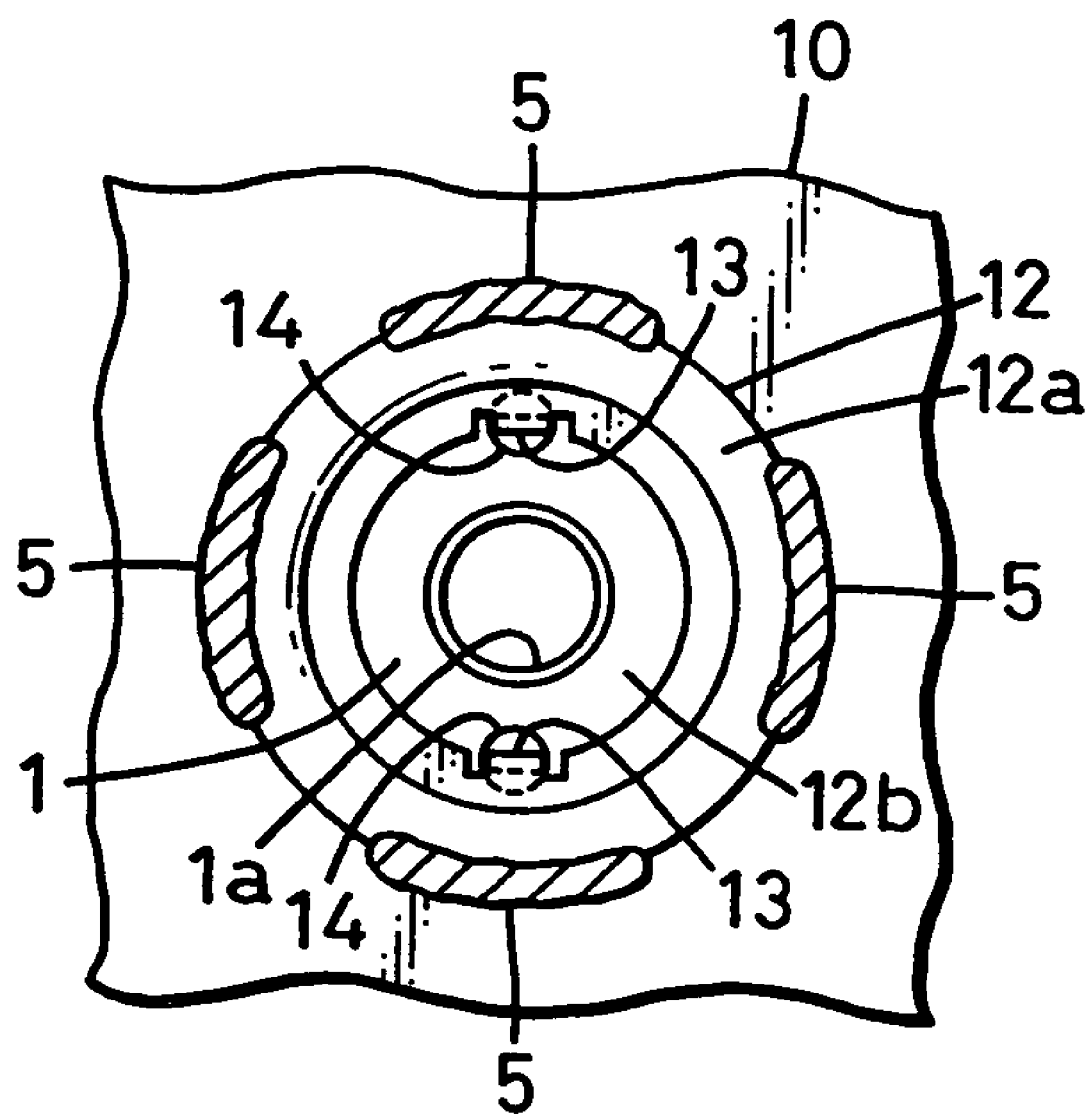
FIG. 5 is a front view of the oil retaining bearing in FIG. 4.

Then, the second embodiment of a motor of the present invention will be described with respect to FIGS. 4 and 5. As shown in FIGS. 4 and 5, an engagement groove 14 is formed on an oil retaining bearing 1 as described in the first embodiment, and a bearing holder 12 is employed instead of the bearing holder 3.

An engagement bore 14 is a blind bore in the oil retaining bearing 1. The engagement groove 14 is circular in this embodiment, but may be rectangular with an engagement claw 13 to be inserted into the engagement groove 14.

A boss 12a of a bearing holder 12 is partially bent to form the engagement claw 13. The engagement claw 13 stands on the surface of the engagement groove 14 as shown in FIGS. 4 and 5. The position and the number of the engagement groove 14 and claw 13 are not limited to those in FIGS. 4 and 5. Over three may be provided and the position may be optionally determined.

The engagement claw 13 inserted in the engagement groove 14 prevents deviation of the oil retaining bearing 1 with respect to the pocket 2 caused by vibration and friction during rotation. An outer brim 12b of the bearing holder 12 is fixed to the outer circumference of the pocket 2, whereby the engagement claw 13 is engaged and fastened in the engagement groove 14 even if the oil retaining bearing 1 rotates.

Owing to engagement of the engagement claw 13 in the engagement groove 14, the oil retaining bearing 1 is prevented from loosening in the pocket 2 thereby avoiding rotation of the bearing together with the shaft 6.

In the embodiments as above, the pocket 2 and oil retaining bearing 1 are provided on a shield-cap side of the casing 10 of the motor "M", but may be provided on a body of the casing 10 with which the shield-cap is engaged.

The foregoing may be merely embodiments of the invention. Various changes and modifications may be made by a person skilled in the art without departing from the scope or spirit of claims.

What is claimed is:

1. The bearing structure of a motor, comprising:
    a casing of the motor;
    a pocket formed on the casing;
    an oil retaining bearing that supports a shaft of the motor and is inserted in the pocket of the casing;
    a bearing holder that is welded on the casing which surrounds the pocket, thereby preventing said oil retaining bearing from coming out of said pocket; and
    wherein a thrust washer is provided around the shaft to contact the oil retaining bearing rotatably, said oil retaining bearing being spaced from a commutator of the motor by a collar surrounding the shaft to form a clearance between the thrust washer and said collar, said clearance being play in a thrust direction of said shaft.

2. The bearing structure as claimed in claim 1 wherein the bearing holder comprises a boss and an outer brim which is welded on the casing which surrounds the pocket.

3. The bearing structure as claimed in claim 1 wherein an engagement claw projecting from the bearing holder is engaged in an engagement groove or a blind bore of the oil retaining bearing thereby preventing rotation of said oil retaining bearing together with the shaft.

4. The bearing structure of a motor, comprising:
    a casing of the motor;
    a pocket formed on the casing;
    an oil retaining bearing that supports a shaft of the motor and is inserted in the pocket of the casing;
    a bearing holder that is welded on the casing which surrounds the pocket, thereby preventing said oil retaining bearing from coming out of said pocket; and
    wherein an engagement claw projecting from the bearing holder is engaged in an engagement groove or a blind bore of the oil retaining bearing thereby preventing rotation of said oil retaining bearing together with the shaft.

5. The bearing structure as claimed in claim 4 wherein the bearing holder comprises a boss and an outer brim which is welded on the casing which surrounds the pocket.

* * * * *